United States Patent
Gvozdanovic

(12) 
(10) Patent No.: US 6,907,003 B1
(45) Date of Patent: Jun. 14, 2005

(54) METHOD OF MONITORING PACKET COMMUNICATIONS TRAFFIC

(75) Inventor: Rade Gvozdanovic, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/396,987

(22) Filed: Sep. 16, 1999

(30) Foreign Application Priority Data

Dec. 23, 1998 (GB) .............................................. 9828593

(51) Int. Cl.$^7$ ............................. H04L 12/28; H04J 3/14
(52) U.S. Cl. .................. 370/232; 370/235; 370/395.64
(58) Field of Search ............................. 370/229–230.1, 370/235.1, 252, 232–235, 395.1, 395.63, 395.64, 253, 395.21, 395.4, 395.43

(56) References Cited

U.S. PATENT DOCUMENTS

| | | | | |
|---|---|---|---|---|
| 5,524,006 A | * | 6/1996 | Hluchyj et al. ............. | 370/233 |
| 5,745,490 A | * | 4/1998 | Ghufran et al. ............. | 370/397 |
| 5,812,527 A | * | 9/1998 | Kline et al. ................ | 370/232 |
| 6,147,998 A | * | 11/2000 | Kelley et al. ............. | 370/395.1 |
| 6,151,302 A | * | 11/2000 | Yoshida ..................... | 370/233 |
| 6,215,768 B1 | * | 4/2001 | Kim ........................... | 370/230 |
| 6,226,264 B1 | * | 5/2001 | Shibata et al. ............. | 370/232 |
| 6,466,542 B1 | * | 10/2002 | Bottiglieri et al. ......... | 370/230 |
| 6,600,720 B1 | * | 7/2003 | Gvozdanovic ............. | 370/230 |

* cited by examiner

Primary Examiner—Chau Nguyen
Assistant Examiner—Soon D. Hyun
(74) Attorney, Agent, or Firm—Barnes & Thornburg

(57) ABSTRACT

A flow of packet or cell-based communications traffic is monitored by: setting a first time interval over which measurements are to be made; counting number of packets flowing during that time interval and using the count to derive parameters which are indicative of the traffic meeting a sustained cell rate (SCR) requirement. Use of this cell counting method rather than a per-cell computation of a generic cell rate algorithm (GCRA) reduces computation requirements in monitoring traffic. Preferably the cell count is used to derive a running difference between the counted number of packets and an expected number of packets.

26 Claims, 12 Drawing Sheets

METHOD OF MONITORING PACKET COMMUNICATIONS TRAFFIC

TECHNICAL FIELD

This invention relates to a method and apparatus for monitoring rate of flow of packet or cell-based communications traffic. It is particularly useful in policing or managing the traffic. The invention is particularly suited to packet-based communications systems such as Asynchronous Transfer Mode (ATM) systems which carry variable bit rate traffic.

BACKGROUND OF THE INVENTION

Communications systems typically have some form of congestion management function to allocate the resources, such as bandwidth on a communications link, to users in a way that prevents the system from becoming congested. Typically some form of connection admission control (CAC) responds to new call requests and admits or refuses calls.

Integrated communications systems are now being developed which can carry a variety of types of traffic, such as voice, data and video. Traffic can be a mix of constant bit rate and variable bit rate traffic. Variable bit rate (VBR) traffic poses particular problems for traffic management as the bit rate of the traffic varies during a call. The effect of a number of VBR sources all operating together can result in a wide range of bit rates for the offered traffic. Clearly, if the offered traffic exceeds the available capacity, it cannot all be sent at the same time. Packet-based communications systems often use a cell-shaping function to "smooth" the peaks in the traffic to fit the traffic to the available resource, by buffering the traffic until it can be sent. However, delay-sensitive traffic such as voice cannot tolerate buffering and therefore cannot be treated in this way.

Some communications systems transport voice traffic using silence suppression, which suppresses silent periods in a conversation, thereby allowing the bandwidth which would have been occupied by data bits carrying those silent portions to be used by other traffic. The use of silence suppression provides some additional capacity on a communications link but also has the effect of turning the voice traffic into variable bit rate traffic. This makes it difficult to predict the actual sustained cell rate (average bandwidth) for a voice trunk using a fixed coding scheme because the ratio of talk to silence is not deterministic.

A network uses a policing or UPC function to ensure that traffic meets an agreed traffic contract. The traffic contract specifies parameters such as peak cell rate (PCR), and sustained cell rate (SCR). The ATM Forum defines a Generic Cell Rate Algorithm (GCRA) for ATM cell rate monitoring. The GCRA is used to define conformance with respect to the traffic contract. For each cell arrival, the GCRA determines whether the cell conforms to the traffic contract of the connection.

The GCRA can be a virtual scheduling algorithm or a continuous-state Leaky Bucket Algorithm. The GCRA is used to define, in an operational manner, the relationship between PCR and CDVT, and the relationship between SCR and the Burst Tolerance (BT). The BT can be derived from PCR, SCR, and MBS. In addition, the GCRA is used to specify the conformance, at the public or private UNI, of the declared values of the above two tolerances, as well as declared values of the traffic parameters PCR and SCR and MBS.

The GCRA algorithm operates on a cell by cell basis, which requires significant processing.

SUMMARY OF THE INVENTION

The present invention seeks to provide a method and apparatus for monitoring communications traffic which overcomes some of the above disadvantages.

According to a first aspect of the present invention there is provided a method of monitoring flow of packet-based communications traffic comprising the steps of:
  setting a first time interval over which measurements are to be made;
  counting number of packets flowing during that time interval;
  using the count to derive parameters which are indicative of the traffic meeting a sustained cell rate (SCR) requirement.

Monitoring based on cell counts taken over a period of time rather than performing a congestion algorithm on a per cell basis means that the need for specialised hardware can be avoided as significantly less processing is required. The congestion function can be performed in software.

The derived parameters can be current packet rate and a running difference between the counted number of packets and an expected number of packets. The running difference parameter is analogous to the leaky-bucket algorithm used in the GCRA. Thus, this method provides estimates to operating parameters of a GCRA without needing to perform the GCRA on a cell-by-cell basis.

Preferably each of the derived parameters is compared with a respective parameter indicative of capacity on the link or an agreed traffic contract, and the result of both comparisons is used to determine compliance with the requirement.

Preferably the method further comprises determining operational states for a traffic source, determining a set of congestion states, each congestion state mapping to an operational state for the source, and wherein comparison of the measured parameters with the parameters indicative of available capacity is used to derive a new congestion state for the source.

Preferably the new congestion state is a function of the old congestion state and the measured parameters. This prevents large swings in the operational state of the source.

Advantageously the first time interval is approximately 500 ms.

Preferably the method further comprises the steps of:
  setting a second time interval over which measurements are to be made;
  counting number of packets flowing during that time interval;
  using the count to derive a parameter which is indicative of the traffic meeting a peak cell rate (PCR) requirement.

Preferably the second time interval is a shorter interval than the first interval. This allows a more accurate determination of peak cell rate. Advantageously the second time interval is in the range 50–500 ms, and preferably it is around 100 ms.

Other aspects of the invention provide apparatus to perform this method.

The preferred embodiment describes the invention in the context of an ATM-based network, but the invention is not limited to use in such a network, and could also be applied to other types of packet or cell based networks such as Internet Protocol (IP) based networks.

Preferred features may be combined as appropriate, and may be combined with any of the aspects of the invention as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which:—

DESCRIPTION OF PREFERRED EMBODIMENTS

Figure 1:
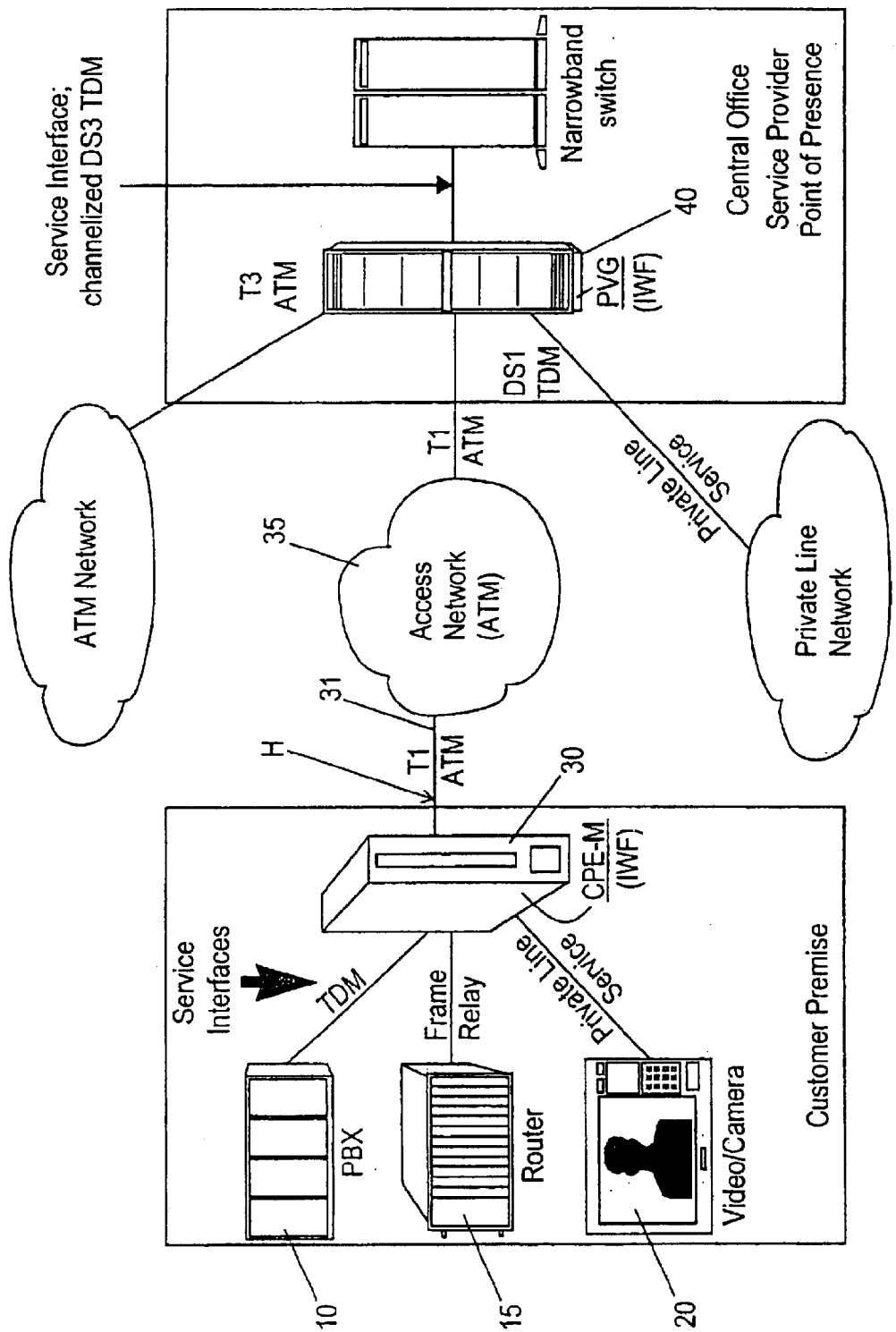
FIG. 1 shows an example of a system for allowing integrated access over an ATM network.

FIG. 1 shows an example of a system for allowing integrated access over ATM from a customer premises. It comprises: a first interworking function (CPE-M, IWF) 30, located at a customer premises, an ATM line link 31 to an operator's point of presence, an ATM network 35, and a second interworking function (IWF) 40 located at the operator's Central Office (CO). The gateway can be a PASSPORT Voice Gateway manufactured by Nortel Networks, and will be referred to as PVG in this document.

The CPE-M takes inputs from various customer premises sources, e.g. routers (Frame Relay) 15, PBX (Private Branch Exchange) 10, or nxDS0 private lines (circuit emulation). These are packaged together onto the T1 ATM access link 31. The combination of voice compression and statistical multiplexing on the access link provides bandwidth efficiency savings and allows multiple customer T1 service interfaces to be supported via a single T1 ATM access link to the service provider's point of presence.

All narrowband services like voice, voice band data (modem), and fax can be transported using ATM Adaptation Layer 2 (ML2) and ATM Adaptation Layer 5 (AAL5) Permanent Virtual Connections (PVCs). User traffic can be carried over AAL2 PVCs, and D channel information for N-ISDN service interfaces can be carried over AAL5 PCs.

Frame relay traffic can be transported over the ATM link using AAL5 PVCs.

Private line traffic can be transported over the access network using AAL1 PVCs. The PVG and CPE-M will have ATM Forum Nx64k structured Circuit Emulation Service (CES) functionality for this purpose.

Higher speed access interfaces, NxT1 interfaces using ATM inverse multiplexing and ATM Switched Virtual Connections (SVCs) and Switched Permanent Virtual Connections (SPVCs) can also be used.

Figure 2:
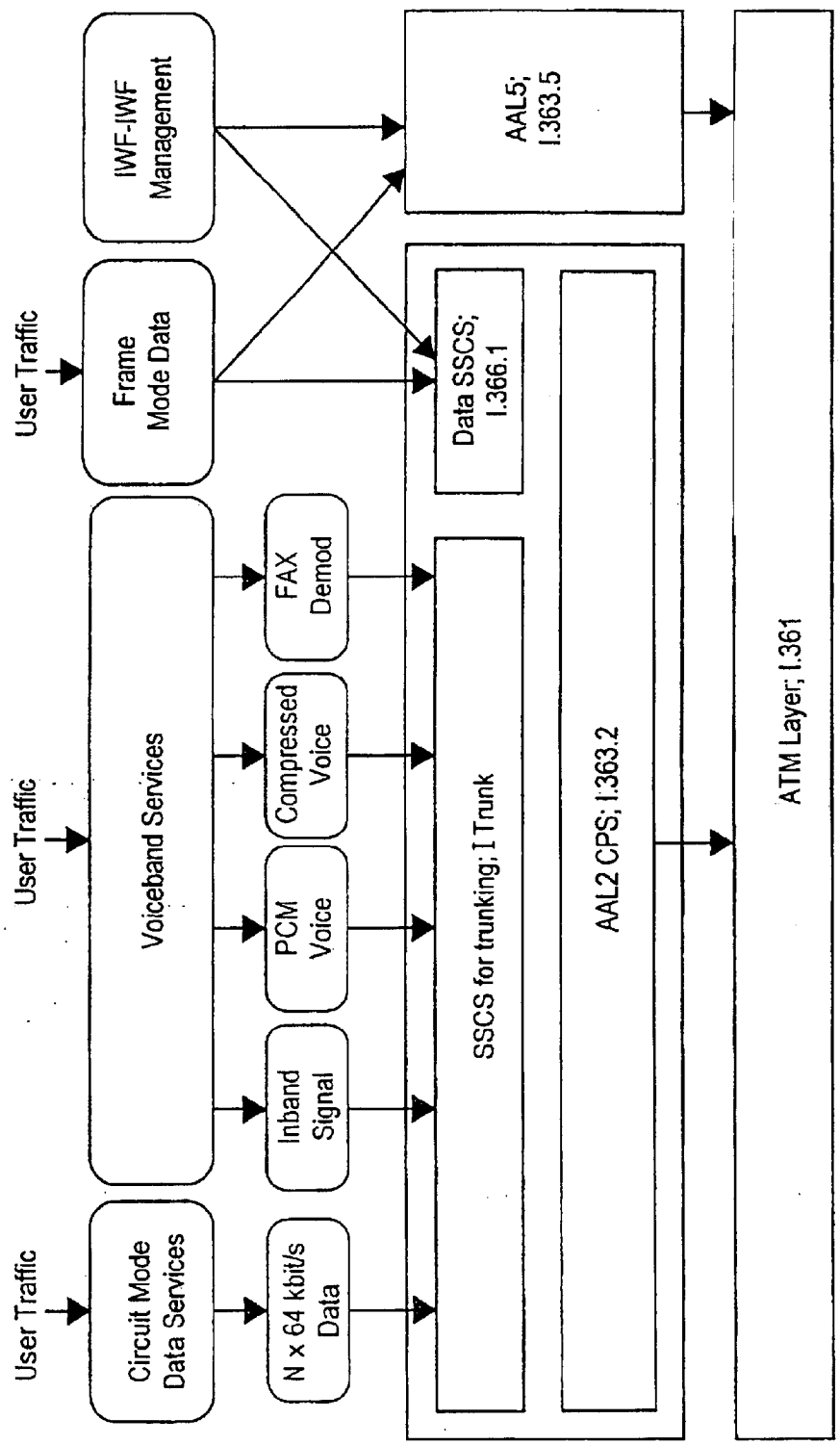
FIG. 2 shows how traffic can be carried over the network of FIG. 1.

FIG. 2 shows the manner in which these services are supported by the various portions of the ATM protocol architecture.

Voice Access System

Figure 3:
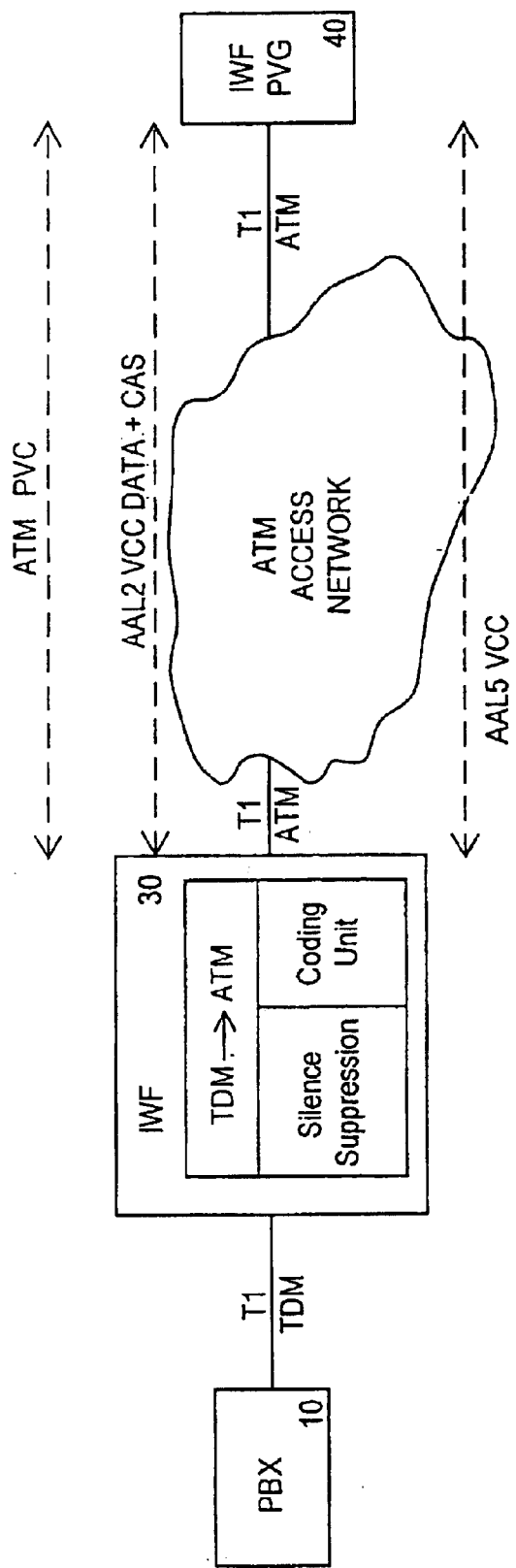
FIG. 3 shows how traffic is mapped to the ATM protocol architecture.

The preferred ATM trunking mechanism employed for this service is the ATM Forum VTOA landline trunking specification "ATM Trunking using AAL2 for Narrowband Services". This is illustrated in FIG. 3.

Voice Data Path

In a typical installation the PCM voice from a PBX 10 is supported at the CPE-M 30 via a T1 interface. The PCM voice is normally compressed at the CPE-M 30 from the normal 64 kbit/s PCM to a lower bit rate such as 32 kbit/s, 24 kbit/s or 16 kbit/s ADPCM. Other bit rates could also be used. CPE-M 30 and PVG 40 also support silence suppression which suppresses, at the transmitting entity, the silent portions of a voice call and regenerates, at the receiving entity, comfort noise in place of the silence. Suppressing silent periods in voice calls allows other traffic, such as data, to use the bandwidth that would have been occupied by the silent periods.

Time slots with active calls are multiplexed using ATM Adaptation Layer 2 (AAL2) for transport over the ATM link.

An efficient traffic management system is required in the Integrated Access system to ensure that quality of service is maintained for both the voice and data traffic while also achieving efficient bandwidth usage. It is also, required to ensure that the integrated access traffic meets its traffic contract with the underlying ATM network.

Voice QOS

The quality of service for the voice traffic can be degraded if at times the offered voice band traffic load exceeds the bandwidth of the underlying bearer circuits. This situation can occur for a number of reasons:

If more voice calls are admitted into the system than can be accommodated by the system using the normal coding scheme.

If the number of voice band data or clear channel data calls admitted is much larger than that engineered for. This causes a bandwidth limitation problem since this type of traffic can not be compressed and therefore takes double the bandwidth of normal voice calls (assuming 32 kb/s ADPCM compression).

If silence suppression is enabled, then speech bursts (simultaneous talkers on a large number of calls in one direction) can cause an instantaneous load of up to double the engineered average (assuming 50% savings through silence suppression). This can exceed the bandwidth of the underlying bearer circuits.

If the load exceeds the available bandwidth for a short period of time, system buffers build up resulting in an increase in overall system delay and delay variation. If the situation persists the delay increases until the buffers overflow resulting in cell loss. Delay, delay variation and cell loss all result in a quality of service impairment and should be avoided.

Data QOS

The Integrated Access system offers QOS guarantees to data traffic and in particular it should guarantee the CIR contract for Frame Relay service traffic. However, the CIR is an average committed rate and, therefore, the CIR rate need only be guaranteed as an average rate over some period of time.

Since voice traffic operates with a higher emission priority to data traffic, data traffic is only transmitted on a link when the voice traffic queue is empty or if shaped voice traffic has already achieved its PCR. In general the result of this is that data traffic only has available to it the bandwidth left over once all voice bandwidth requirements have been accommodated. In the extreme case this means that during periods of sustained voice traffic load (the voice queue never empties) no data traffic is transmitted.

In order to guarantee a minimum CIR bandwidth for the frame relay traffic the voice traffic should, therefore, be regulated to a provisioned maximum level. Since CIR is an average the regulation of the voice traffic need only be done as an average over some time interval. Over this time interval voice traffic can periodically burst at the speed of the link and periodically be completely absent (due to silence). The time period for the averaging depends on factors such as the bandwidth of the links, the value of the minimum bandwidth and the size of the buffers in the network equipment and the maximum permissible delay for frame relay traffic. The system should be designed so that buffers never overflow if the customer is within his CIR value.

As long as the average bandwidth available to frame relay traffic over this period is sufficient the system is considered to meet its data QOS requirement. If the offered load from voice traffic is such as to not leave sufficient bandwidth for frame relay the system must take some action to ensure the frame relay QOS is maintained.

ATM Traffic Parameters

In a preferred embodiment voice traffic is carried over an ATM network in AAL2 VCCs using VBR_rt (Variable Bit Rate real time) class of service. Up to 255 voice or data connections can be made in one AAL2 VCC which forms a virtual trunk. Since this AAL2 VCC is carried over ATM its traffic characteristics need to be specified using the standard parameters for any VBR_rt VCC. This is necessary so that the ATM network can allocate the appropriate resources. If the AAL2 VCC does not comply with these traffic parameters then the ATM network is unable to guarantee the QOS for its service traffic.

The key parameters defined for a source traffic descriptor for VBR_rt QOS are:

PCR: Peak Cell Rate. This is the maximum rate at which the voice application is permitted to emit cells into the ATM network.

SCR: Sustained Cell Rate. This is the maximum long term average rate at which the voice application is permitted to emit cells into the ATM network. Generally SCR<PCR MBS: Maximum Burst Size. This is the maximum number of cells which the voice application is permitted to emit into the ATM network at PCR within the terms of the SCR contract. This parameter defines the burstiness of the VBR traffic and may be used along with the PCR and SCR to define bounds on burst durations.

The responsibility for complying with these parameters lies largely with the Integrated Access System voice application because the ATM network, in trying to shape the traffic at the ATM layer, can potentially result in unacceptable delays to the voice traffic.

The Integrated Access System frame relay traffic is carried over an ATM network in AAL5 VCCs using ABR (Available Bit Rate) class of service.

The key parameters defined for a source traffic descriptor for ABR QOS are:

PCR: Peak Cell Rate this is the maximum rate which the frame relay application is permitted to emit cells into the ATM network.

MCR: Minimum Cell Rate, this is the minimum cell rate required by the frame relay connection in order to meet service commitments.

Note that normally the Integrated Access System will carry many frame relay VCCs. The Aggregate MCR for all of these VCCs is, in general, not a straight sum of the individual MCRs, but will be engineered according to the customers service contract. In general therefore:

$$MCR_{total} = K \Sigma MCR_{individual}$$

Where K is an engineered constant less than 1.

Integrated Access Traffic Model

Considering the flow of traffic between the CPE and PVG, and vice versa, in order to maintain QOS guarantees, the PVG and CPE must both ensure that all traffic abides by its configured ATM traffic parameters. In the normal case these parameters are defined to accommodate a mix of traffic at a bottleneck located at point H (see FIG. 1), which is the T1 (or nxT1) access link between the CPE and the ATM network.

Requirement for PCR Traffic Shaping

Traffic shaping may be required on an ATM VCC whenever an application is capable of producing short bursts of data at a short term rate significantly in excess of PCR. An analysis of the voice application of the Integrated Access System shows that it can behave in a very bursty manner due to the uncorrelated nature of the individual voice coders and packetizers.

Each voice coder produces a voice packet every 10 ms. Since all the packetizers operate independently this means that it is possible for all 24 packetizers on a single VCC to produce a packet simultaneously. This means that viewed on a cell by cell basis over a 10 ms period, the voice traffic offered load may consist of bursts of cells due to cell clumping caused by simultaneous generation of voice packets from uncorrelated multiple DS0s within the same VCC.

This must be catered for in the cell scheduling algorithms of both the CPE and the PVG, but is of particular concern at the PVG since the PVG is capable of generating voice traffic at instantaneous rates much higher then the link bandwidth available at H. If left unconstrained this could lead to significant bursts of cells from the PVG at rates far exceeding PCR (up to DS3 or OC3 line rate).

These bursts are bounded (to 24 cells for a single T1) and could be accommodated by the network with appropriate CDVT parameters. However, in order to simplify network engineering it is advised that the PVG be configured to shape the VBR_RT voice VCCs to the Peak Cell Rate. This shaping is only employed to remove the cell clumping effect and it does not deal with the case where speech bursts cause a longer term violation of PCR. If the offered load exceeds PCR for a significant length of time and shaping is employed, the cell transfer delay will increase as the shaper buffers fill, and eventually the shaping buffers will overflow and cells will be lost.

This longer term violation of PCR due to speech bursts is a problem regardless of whether shaping is employed since it will cause buffer build up at the system bottleneck (usually link H). The rest of the discussion on PCR conformance in this section will concentrate on how this longer term violation of PCR is managed.

Traffic Profile on Access Link (H)

Figure 4:
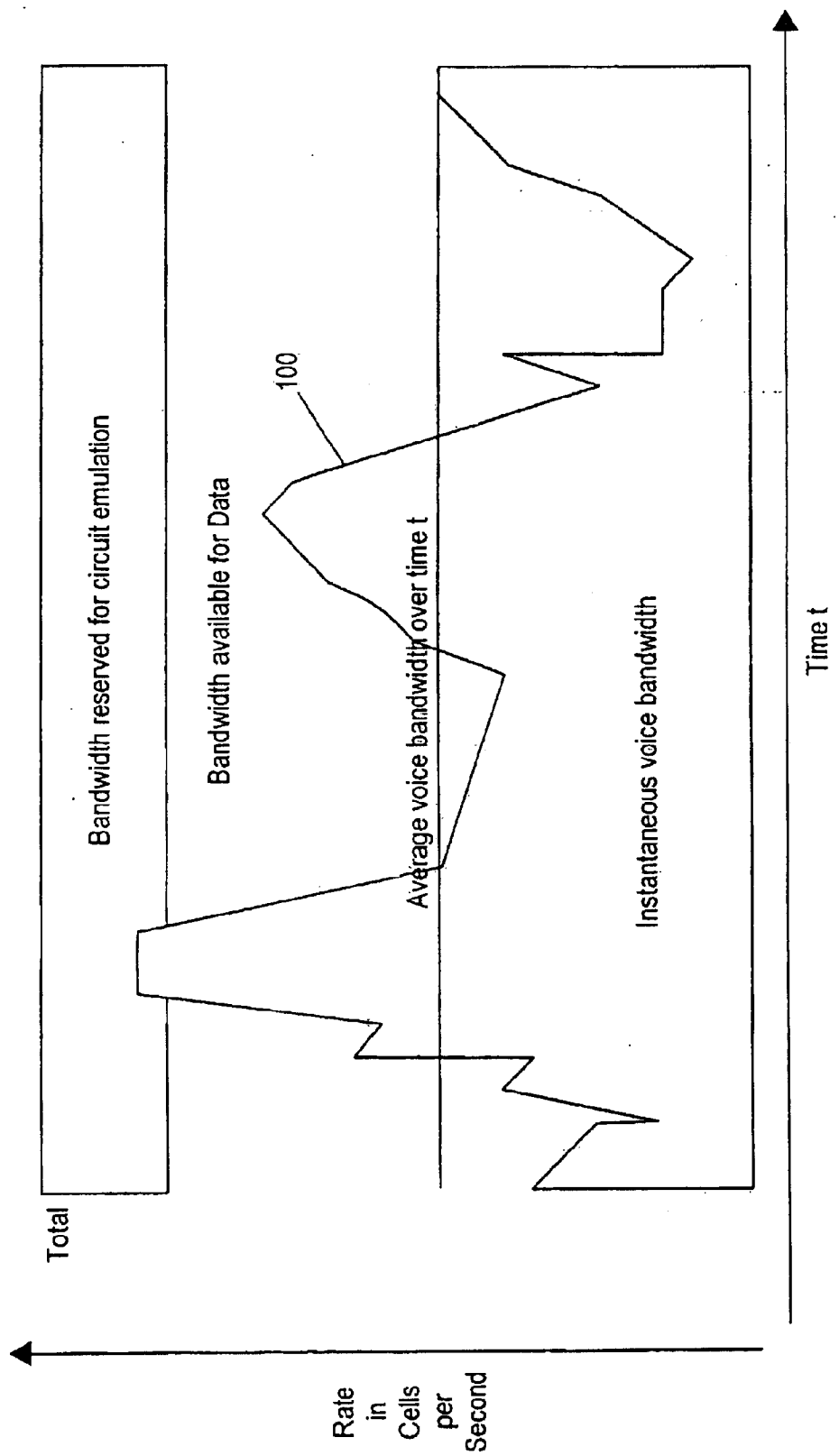
FIG. 4 shows an example profile for traffic carried over the network of FIG. 1.

An example of traffic on the link H over a period of time t (t>>10 ms) is shown in FIG. 4. This illustrates how the instantaneous voice bandwidth 100 varies dynamically according to the number of active calls and the number of active speakers. Note that the actual rate of change of the voice traffic will vary considerably from environment to environment and will also depend on the configuration of the silence suppression algorithm.

In general the voice bandwidth will vary between the maximum allocated bandwidth and zero. The offered load for voice traffic could potentially exceed the maximum allocated peak or even the bandwidth of the link.

The average bandwidth available for data traffic can be deduced to be:

Average bandwidth available for data=the bandwidth of the link−Bandwidth reserved for circuit emulation−Average voice bandwidth The instantaneous data bandwidth will vary between the maximum allocated voice bandwidth and zero.

Figure 5:
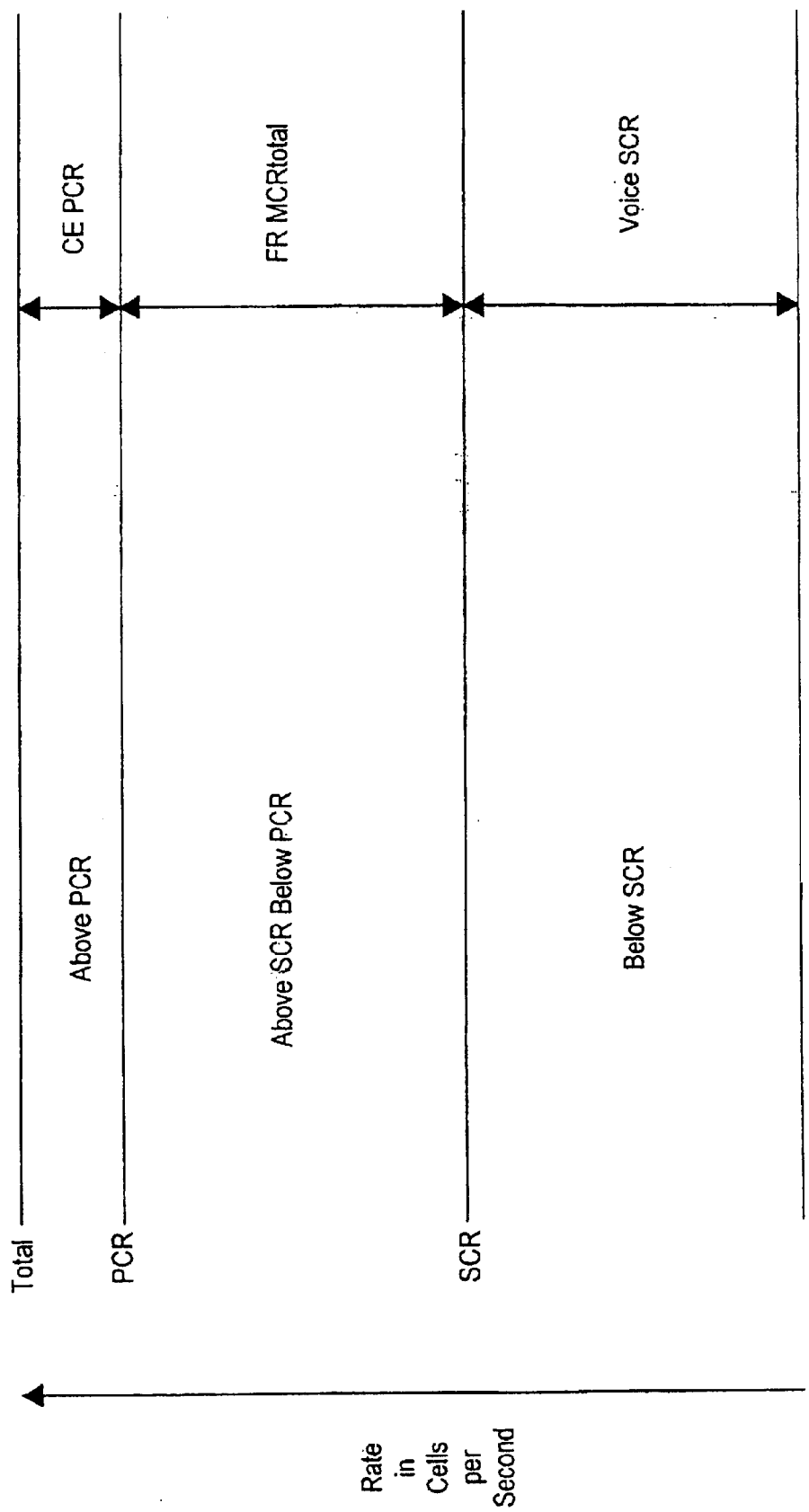
FIG. 5 shows an example of traffic allocation on the network of FIG. 1.

The recommended mapping to ATM traffic parameters is shown in FIG. 5.

| | |
|---|---|
| PCRvoice = | the bandwidth of the link Bandwidth reserved for circuit emulation |
| SCRvoice <= | the bandwidth of the link Bandwidth reserved for circuit emulation MCRframe_relay |
| PCRframe_relay = | the bandwidth of the link Bandwidth reserved for circuit emulation |

This assumes that the frame relay traffic is not time critical so that the MCR need only be guaranteed on the same timeframe as the SCR for voice. This means that the frame relay traffic over the access link may be temporarily halted completely while the voice traffic bursts at PCR. The duration of these bursts is bounded by:

Max_Burst_Duration_voice=MBSvoice/PCRvoice

Where MBS=Maximum Burst Size

Max_Burst_Duration_voice is the maximum length of time that the voice channel is allowed to transmit at PCR and therefore blocks frame relay traffic. Following such a burst the voice system can continue to transmit cells at or below SCR, but may not transmit at above SCR until it has been idle for long enough that the generic cell rate algorithm associated with its SCR to accumulate sufficient credit for another burst (ie it must be zero before a full maximum burst is possible). The shortest time that is allowed between consecutive maximum bursts, assuming no more cells are transmitted between the bursts, is defined by the Burst tolerance parameter:

BTvoice=(MBSvoice−1)(1/SCRvoice−1/PCRvoice)

This guarantees the MCR for the frame relay traffic and bounds the maximum buffering required for this traffic against MCR.

Buffering_against_MCR=MCR×Max Burst_Duration_voice

It also bounds the maximum delay to frame relay traffic at MCR caused by voice bursts to:

Max_FR_delay_voice_burst=Max_Burst_Duration_voice.

Figure 6:
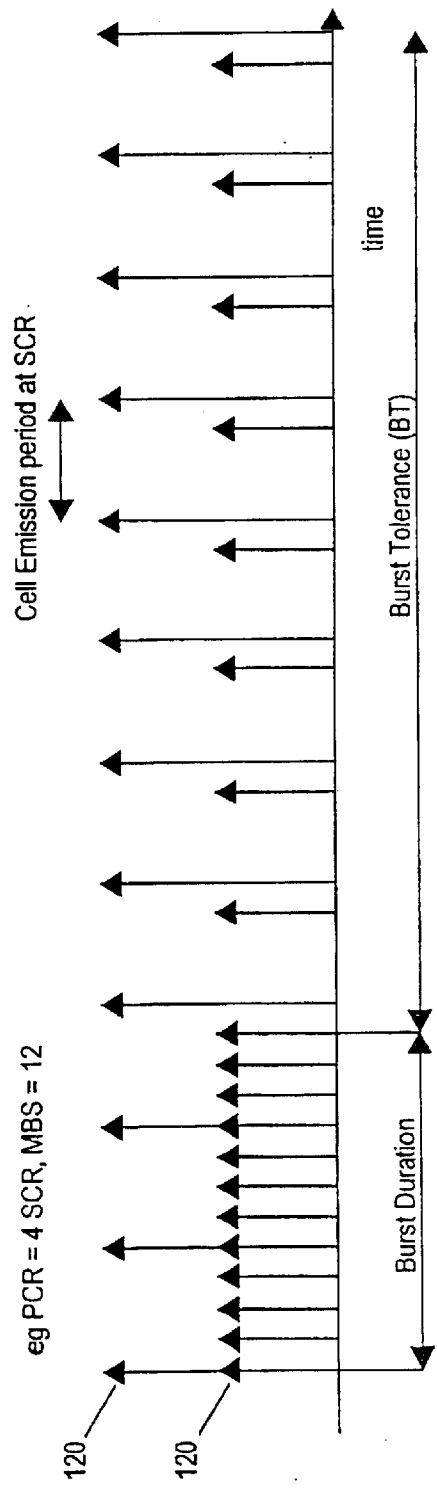
FIGS. 6–8 show examples of traffic patterns in the network of FIG. 1.
Figure 7:
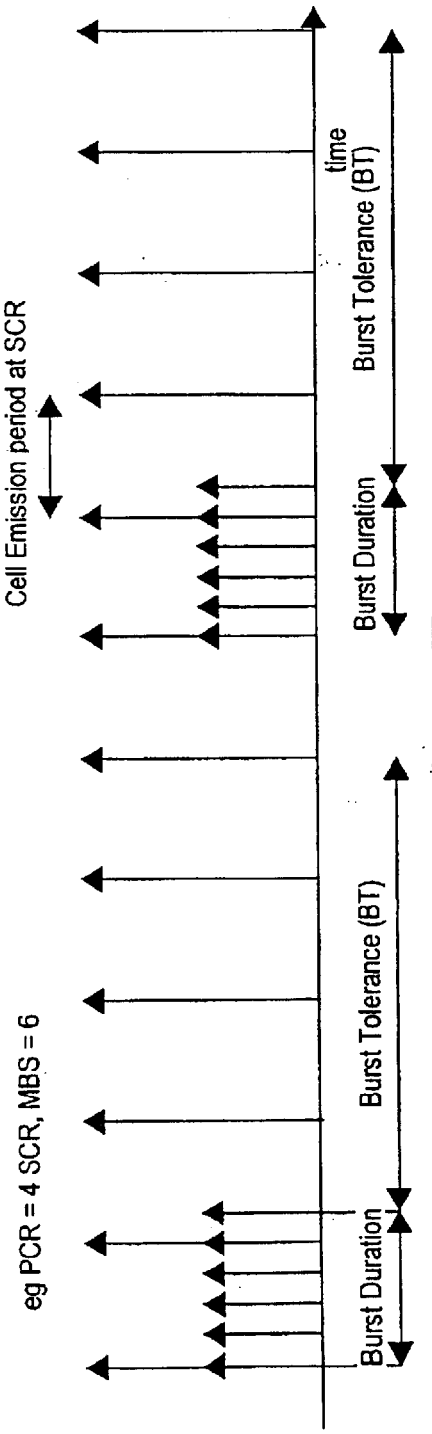
Figure 8:
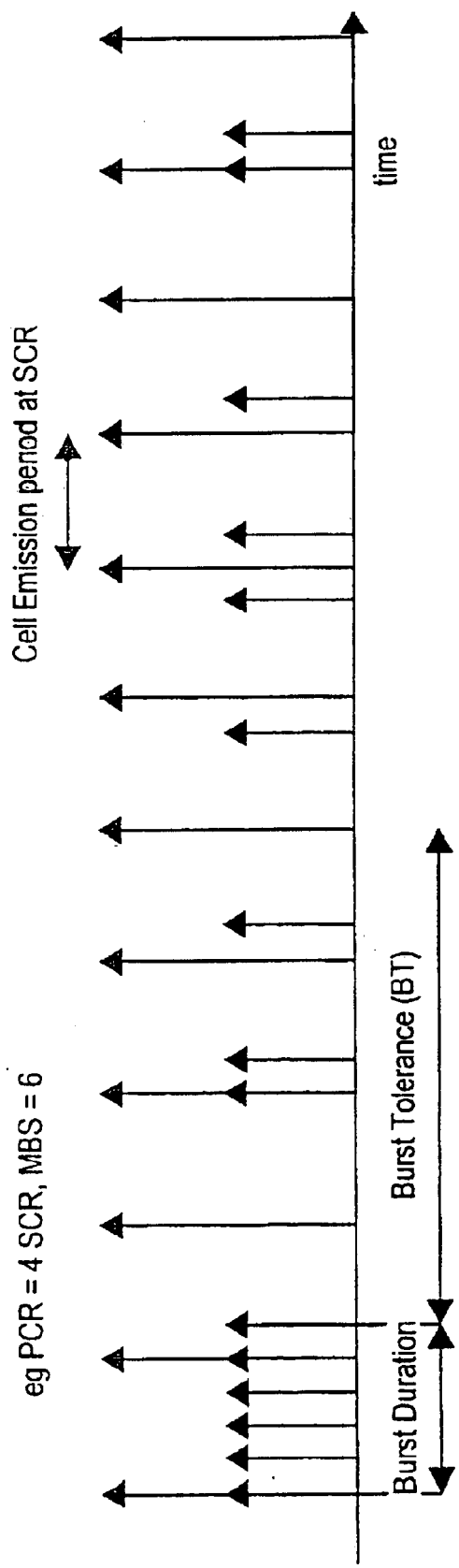

FIGS. 6–8 show three examples of traffic patterns which help to illustrate the relationship between the qualities Peak Cell Rate (PCR), Sustained Cell Rate (SCR), Maximum Burst Size (MBS) and Burst Tolerance (BT). In each example, each arrow represents a cell emission. The lower row of arrows 110 represents the actual cell emissions, and the upper row 120 represents cell emission spaced at intervals that meet the SCR parameter.

In FIG. 6 the peak cell rate is four times the sustained cell rate (PCR=4SCR), and a maximum burst size of 12 is allowed. The figure shows a burst of maximum length (12 cells) followed by a stream of single cells at the sustained cell rate, and the consequent burst tolerance period (BT).

In FIG. 7, PCR=4SCR and a maximum burst size of 6 is allowed. The figure shows two consecutive bursts, each of maximum burst size (6 cells), separated by the burst tolerance period.

In FIG. 8, again, PCR=4SCR and MBS=6 cells. A single burst of maximum burst size (6 cells) is followed by several short bursts which are sufficiently spaced to meet the link criteria.

In a system using silence suppression for voice traffic it is difficult to deterministically predict the actual sustained cell rate (average bandwidth) for a voice trunk using a fixed coding scheme since the ratio of talk to silence is not deterministic. In order to achieve acceptable efficiency it is important to allow engineering guidelines which assume a reasonable average saving (say 50%) and provide an effective congestion management system which deals with periods where the offered load temporarily exceeds the capacity of the link.

Congestion Management Principles

The congestion management strategy is based on the following principles:

1. Congestion for voice and data should work independently
    Congestion controls for Frame Relay (FR) are triggered by status information regarding FR.
    Congestion controls for voice are triggered by status information regarding voice.
2. In the absence of other traffic, FR traffic (CIR+EIR) can obtain the full bandwidth of the access link and can be emitted as back-to-back cells.
3. During busy periods of the FR queue, the FR traffic attains at least its minimum bandwidth over a time period at least as small as T seconds. (Tentative value of T is 1.) i.e. the voice traffic does not squeeze the FR below its minimum bandwidth.
4. Voice traffic can obtain the full access bandwidth (can be emitted as back-to-back cells) over a short period.
5. The voice congestion management system (CAC+downspeeding) ensures voice traffic does not exceed a bandwidth SCR over a time period T seconds (T~1s).
6. During periods of congestion when both the voice and FR buffers facing the access facility are occupied, voice traffic attains an average (over a period T) bandwidth equal to the access bandwidth minus (circuit-emulation & signalling bandwidth+FR minimum portion). And the FR traffic attains an average bandwidth (over the same period T) of the minimum provisioned FR bandwidth.
7. During this period, congestion controls for FR may be triggered by the status of FR buffer, and congestion controls for voice may be triggered by the status of the voice buffer.

Congestion Management Strategy

Congestion management strategy uses a two stage approach. The first attempts to manage the potential for congestion through connection admission control (CAC). The second responds to congestion as it occurs in real time in order to maintain system operation during periods when the offered load temporarily exceeds the provisioned ATM traffic parameters.

First Line Congestion Management

The objective of the first line of congestion management is to use Connection Admission Control (CAC) procedures to limit the number of calls which will be accepted by the Integrated Access system to try to limit the offered load and thereby avoid congestion. The CAC algorithm must take into account the total number of channels, and their actual operating rate. Digital data and voice band data channel will typically run uncompressed and will therefore consume more bandwidth than voice channels.

The user provisions the CAC thresholds which characterize the upper bound for customer traffic for a particular VTOA trunk (AAL2 VCC).

Once call blocking is implemented call attempts which exceed provisioned values are rejected.

Second Line (Reactive) Congestion Management

The statistical nature of voice traffic with silence suppression means that the exact mean bandwidth cannot be accurately predicted (since it depends on saving due to silence which is non deterministic) and that, periodically, the traffic suffers from speech bursts when many speakers (above the average) all speak at once. An example of a speech burst would be if speech occurred simultaneously on all 24 timeslots of a T1 trunk while the average may be speech on only 12 channels.

Second line congestion management is used to control congestion caused by this statistical behaviour. Employing a reactive, real time, congestion management system allows the system to be engineered much more aggressively than it would need to be if only first line congestion management was implemented.

This allows the CAC parameters to be set higher, allowing more calls to be transported, while still maintaining quality.

Voice and Voice Band Data Encoding

Based on call type and ATM capacity congestion state, user data is carried at different rates. Each call can be either speech, data, modem or fax calls. Under non-congested conditions, data calls are carried transparently without any treatment at 64 kb/s. Similarly, under non-congested conditions, modem/fax calls are carried either as 64k PCM or 32k ADPCM. This is user provisionable. The rate of transport for modem and clear channel data will not change, except under heavy congestion. In contrast, voice call transport rate may change dynamically with congestion. However, maximum and minimum voice rate will be user provisionable. During no congestion, the maximum voice rate will be used and under heavy congestion, minimum rate will be used. During light to moderate congestion conditions, other rates between these two limits will be used.

The following coding rates can be used for voice transport:

64 kbps PCM (ITU-T G.711)

32 kbps, 24 kbps and 16 kbps

The following provisionable attributes can be provided to control the Voice Encoding capability on a per DS1 basis:

Modem Rate: This attribute specifies the encoding algorithm used when 2100 Hz tone is detected for any "channel". The default setting is 64K PCM.

Max Voice Rate: This attribute specifies the encoding algorithm to be used for a voice call when no congestion condition exists. The default setting is 32K ADPCM.

Min Voice Rate: This attribute specifies the minimum speed encoding algorithm to be used for a voice call during heavy congestion. In order for congestion management procedures to operate effectively the rate of this parameter should be less than that provisioned in 'Max Voice Rate'. The default setting is 16K ADPCM.

In summary:

Encoding Rates and Algorithms

| Attribute | Setting options | Default settings |
| --- | --- | --- |
| Modem Rate | 64K PCM, 32K ADPCM | 64K PCM |
| Max Voice Rate | 64K PCM, 32K ADPCM, 24K ADPCM 16K ADPCM | 32K ADPCM |
| Min Voice Rate | 64K PCM, 32K ADPCM, 24K ADPCM 16K ADPCM | 16K ADPCM |

Figure 9:
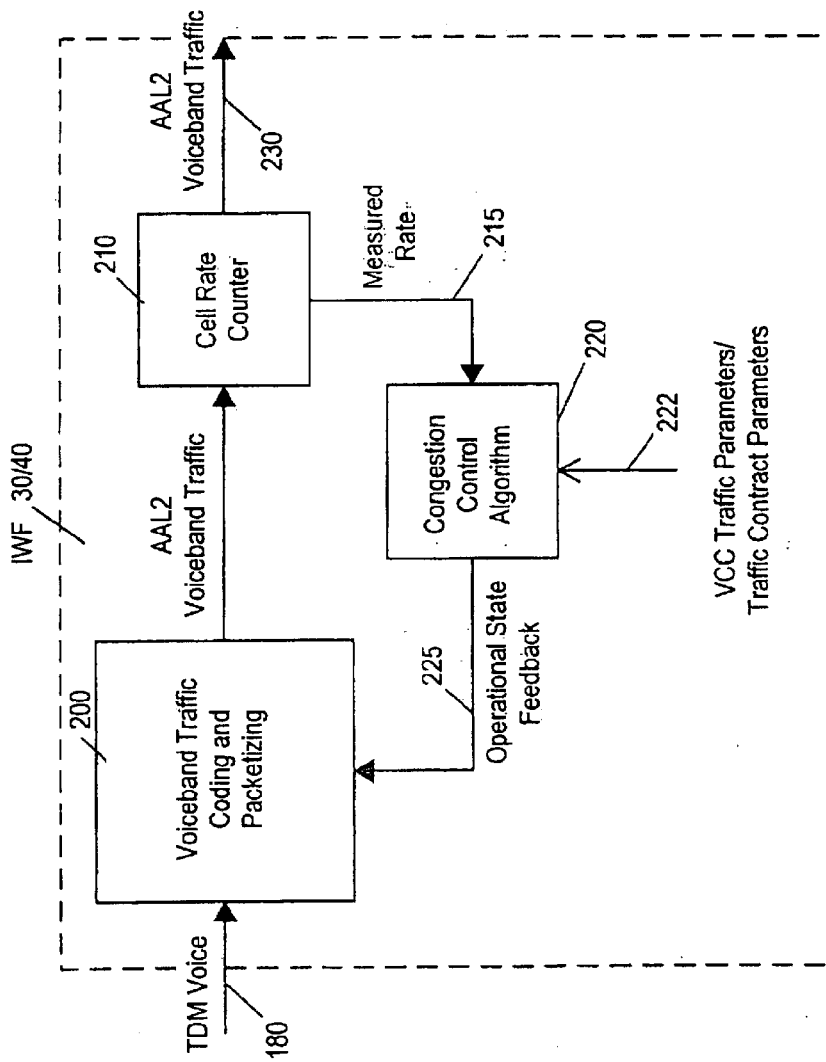
FIG. 9 shows apparatus for controlling offered traffic on the network of FIG. 1.

The second line congestion management operates using a closed loop feedback control system. It has three components shown in FIG. 9:

a Voiceband Traffic Coding and Packetizing unit 200 a Cell Rate counter 210 a Congestion Control Algorithm 220

The Voiceband Traffic Coding and Packetizing unit receives TDM traffic 180 for transport over an AAL2 VCC. The unit can code the TDM traffic at various ADPCM rates and may apply silence suppression. This unit outputs ATM cells containing the coded and packetized voice traffic.

The Cell Rate Counter 210 measures the number of cells transmitted per VCC by the Voiceband Traffic Coding and Packetizing unit 200 over a period of time. It passes this information 215 to the Congestion Control Algorithm 220.

The Congestion Control Algorithm 220 uses the cell count information, along with the provisioned ATM VCC traffic parameters 222 and its current congestion state information, to derive a new congestion state for a particular AAL2 VCC. Once a congestion state is derived this is used to set the operational state of the Voiceband Traffic Coding and Packetizing unit 200 via a feedback path 225. This modifies the operation of the Voiceband Traffic Coding and Packetizing unit 200 and thus modifies the offered load on the ATM VCC 230.

Normally this means that if a voice connection is congested ADPCM down-speeding will be invoked on the voice traffic in order to reduce the offered load and ease the congestion. A number of levels of down speeding are provided and invoked according to the severity of the congestion. Data and modem calls cannot normally be down-speeded so if a high proportion of active calls are data or modem calls, down-speeding the voice calls may not have the desired effect on the aggregate cell rate. Hence it is very important to engineer the system based on the traffic mix expected on each TDM interface.

In summary therefore:

Second line congestion management uses a closed loop feedback system to invoke ADPCM down-speeding to enforce provisioned PCR and SCR for voice traffic.

If Actual Source Rate>PCR or SCR, down-speed voice traffic

Actual Source rate is measured (e.g. through queue fill or rate counting)

PCR is measured over~100 ms

SCR is measured over~500 ms

Note: down-speeding against PCR is to avoid queue overflow or large PDV, down-speeding against SCR is to guarantee Bandwidth for Frame Relay.

Congestion Control Procedures

Congestion Avoidance Provisioning Checks

The PVG and CPE perform the following provisioning checks to help avoid an ATM VCC congestion condition from occurring:

Calculate the minimum rate required using the provisioned attribute values:

Minimum Rate Required=Max Clear Channel×64K+Max Voice Band Data Channels×Modem rate+Voice Channels×Min CBR Rate The calculated Minimum Rate Required (MMR) is then converted to an ATM cell rate. This value is compared with the provisioned Sustained Cell Rate(SCR) for the appropriate ATM VCC. An error message will be output to inform user, if the MMR exceeds the ATM VCC Sustained Cell Rate(SCR).

Narrowband Connection Admission Control Procedures

Under normal conditions when an ATM VCC is not under severe congestion, following procedure will be used for allowing new calls:
1. All voice calls will be allowed.
2. Clear Data channel calls will be allowed but will be marked for special congestion treatment if the permitted number of "Clear Channels" as specified in the "Max Clear Channels" attribute is exceeded.
3. Voice band data calls will be allowed but any call which exceeds the permitted number of Voice band data channel calls as specified in the "Max Voice Band Data Channels" attribute, will be marked as a 'max-VBD-violator'.

When an ATM VCC is in severe Congestion condition, the following procedure will be used for allowing new calls:
1. Allow new voice at the current voice rate for the VCC.
2. If 2100 Hz tone is detected (i.e. a voice band data call)
   If changing this call from voice to voice-band-data does not exceed "Max-voice-band-data-channels": then start transporting at modem-rate.
   If changing this call from voice to voice-band-data exceeds "Max-voice-band-data channels": then continue transporting but at the provisioned minimum voice rate and mark the call as 'max-VBD-violator'.
3. Allow new Clear Data call but restrict data transport for that channel to the provisioned minimum voice rate. Note that this will normally corrupt the data but it will prevent receiver underflow integration timers expiring.

Note that if call blocking is implemented the concept of carried violating calls may not be required since violating calls can be blocked.

Congestion Reaction Procedures

The following procedures will be invoked in reaction to detection of various levels of congestion:

Enable silence suppression for all existing voice channels which have the "Silence Suppression" capability set to "on congestion" for the affected ATM VCC i.e. use silence suppression if the channel allows it.

Down-speed all voice channels in a DSI to the appropriate rate (eg; 64k G711->32k G726->24k G726->16k G726).

Under extreme congestion conditions the following procedures will be invoked:

Down-speed all violating voice-band-data channels which have been marked for congestion treatment ('max-VBD-violator') for the affected ATM VCC to the provisioned minimum voice rate.

Violating "clear data channel" calls which have been marked for congestion treatment for the affected ATM VCC will be transported at the provisioned minimum voice rate. Note that this will normally corrupt the data but it will prevent receiver underflow integration timers expiring.

Narrowband Data Processing Operational States

The actual operation of the voice coder at any point in time is defined by its operational state (OSx). The operational state defines the current connection rate for the associated channel, and whether silence suppression is enabled or disabled. There are eight possible operational states of the voice coders. These are defined as:

| Voice Connection operational states | | |
|---|---|---|
| Rate | SS off | SS on |
| 64 kb/s | OS0 | OS1 |
| 32 kb/s | OS2 | OS3 |
| 24 kb/s | OS4 | OS5 |
| 16 kb/s | OS6 | OS7 |

The operation of the coder for a voice band data channel at any point in time is defined by its voice band data operational states. Two sets of voice band data operational states are defined: one set for conforming voice band data channels and one set for voice band data channels which violated the CAC algorithm and have been marked for special congestion treatment. In each case the voice band data operational state defines the current voice band data coding rate for the associated channel. There are four possible operational states of the voice band data coders. These are defined as:

| Voiceband Data connection operational states | |
|---|---|
| Voiceband data/ | VBD_OSx |
| 64 kb/s | VBD_OS0 |
| 32 kb/s | VBD_OS1 |
| 24 kb/s | VBD_OS2 |
| 16 kb/s | VBD_OS3 |

Note that two VBD_OSx states will exist per VCC, one for conforming voice band data channels and one for voice band data channels which violated the CAC algorithm.

For any one call, once a violating voice band data call has had its operational speed reduced during congestion, the voice processor should not increase the speed of the channel for the duration of that call, even if congestion abates. This behaviour improves the performance of most modems since coding rate changes may cause some modems to drop calls.

The operation of the coder for a clear channel data channel at any point in time is defined by its clear channel data operational state (DOSx). The clear channel data operational state defines the current clear channel data policy for the associated channel. There are two possible operational states of the data coders. These are defined as:

| Clear Channel Data Connection operational states | |
|---|---|
| Clear Channel data policy | |
| Carry all clear channel data channels at 64 kb/s | DOS0 |
| Continue to carry conforming clear channel data connection at 64 kb/s. Violating "clear data channel" calls which have been marked for congestion treatment are carried at 16 kbit/s. Note that this will corrupt the channel, however it will normally reduce the rate and help to alleviate congestion, while preserving some flow of data to prevent triggering of underflow integration timers at the receiver. | DOS1 |

The complete operational state is composed of the set of voice, voice band data conforming, voice band data violating and clear channel data operational states.

Narrowband Congestion States

The narrowband congestion state defines the level of reaction to congestion for a narrowband datapath processing system.

The narrowband congestion states possible for a given VCC are derived automatically by the Integrated Access equipment from the provisioned values of: Min_Voice_Rate, Max_Voice_Rate, and Silence Suppression. A maximum of 6 congestion states can be defined corresponding to the maximum possible allowed set of operational states. The actual number of congestion states will depend on the possible values of voice rate provisioned and if Silence Suppression is invoked on congestion. Each congestion state is mapped on to an allowed set of operational states.

The mapping of congestion states to a set of operational states creates a matrix which defines system operation for each congestion state.

In general the following rules are followed:

CS0 is defined to be no congestion under highest quality voice conditions (ie at Max_Voice_Rate).

If Silence Suppression is invoked on congestion then this should be invoked before downspeeding the voice coder.

The highest congestion state always maps to an operational state which acts to reduce congestion by reducing the coding rate of voice calls to Min_Voice_Rate, as well as downspeeding CAC violating voiceband data channels to Min_Voice_Rate and stop transporting the CAC violating "clear data channel" calls.

The following five examples illustrate how the system will operate with different settings.

EXAMPLE 1

Min_Voice_Rate=24 kb/s
Max_Voice_Rate=64 kb/s
Modem_Rate=64 kb/s
Silence Suppression=on congestion

| Congestion State | Voice Operational State | Voiceband Data Operational State | Voiceband Data Operational State (Violating) | Digital Data Operational State |
|---|---|---|---|---|
| CS0 | OS0 | VBD_OS0 | VBD_OS0 | DOS0 |
| CS1 | OS1 | VBD_OS0 | VBD_OS0 | DOS0 |
| CS2 | OS3 | VBD_OS0 | VBD_OS0 | DOS0 |
| CS3 | OS5 | VBD_OS0 | VBD_OS0 | DOS0 |
| CS4 | OS5 | VBD_OS0 | VBD_OS2 | DOS1 |

EXAMPLE 2

Min_Voice_Rate=16 kb/s
Max_Voice_Rate=32 kb/s
Modem_Rate=64 kb/s
Silence Suppression=on

| Congestion State | Voice Operational State | Voiceband Data Operational State | Voiceband Data Operational State (Violating) | Digital Data Operational State |
|---|---|---|---|---|
| CS0 | OS3 | VBD_OS0 | VBD_OS0 | DOS0 |
| CS1 | OS5 | VBD_OS0 | VBD_OS0 | DOS0 |
| CS2 | OS7 | VBD_OS0 | VBD_OS0 | DOS0 |
| CS3 | OS7 | VBD_OS0 | VBD_OS3 | DOS1 |

EXAMPLE 3

Min_Voice_Rate=16 kb/s
Max_Voice_Rate=32 kb/s
Modem_Rate=32 kb/s
Silence Suppression=on congestion

| Congestion State | Voice Operational State | Voiceband Data Operational State | Voiceband Data Operational State (Violating) | Digital Data Operational State |
|---|---|---|---|---|
| CS0 | OS2 | VBD_OS1 | VBD_OS1 | DOS0 |
| CS1 | OS3 | VBD_OS1 | VBD_OS1 | DOS0 |
| CS2 | OS5 | VBD_OS1 | VBD_OS1 | DOS0 |
| CS3 | OS7 | VBD_OS1 | VBD_OS1 | DOS0 |
| CS4 | OS7 | VBD_OS1 | VBD_OS3 | DOS1 |

EXAMPLE 4

Min_Voice_Rate=32 kb/s
Max_Voice_Rate=32 kb/s
Modem_Rate=64 kb/s
Silence Suppression=on

| Congestion State | Voice Operational State | Voiceband Data Operational State | Voiceband Data Operational State (Violating) | Digital Data Operational State |
|---|---|---|---|---|
| CS0 | OS3 | VBD_OS0 | VBD_OS0 | DOS0 |
| CS1 | OS3 | VBD_OS0 | VBD_OS1 | DOS1 |

EXAMPLE 5

This example illustrates the maximum number of congestion states possible, given the widest range of voice coding rates and Silence Suppression set to "on congestion"

Min_Voice_Rate=16 kb/s
Max_Voice_Rate=64 kb/s
Modem_Rate=64 kb/s
Silence Suppression=on congestion

| Congestion State | Voice Operational State | Voiceband Data Operational State | Voiceband Data Operational State (Violating) | Digital Data Operational State |
|---|---|---|---|---|
| CS0 | OS0 | VBD_OS0 | VBD_OS0 | DOS0 |
| CS1 | OS1 | VBD_OS0 | VBD_OS0 | DOS0 |
| CS2 | OS3 | VBD_OS0 | VBD_OS0 | DOS0 |
| CS3 | OS5 | VBD_OS0 | VBD_OS0 | DOS0 |
| CS4 | OS7 | VBD_OS0 | VBD_OS0 | DOS0 |
| CS5 | OS7 | VBD_OS0 | VBD_OS3 | DOS1 |

Congestion Detection

Figure 10:
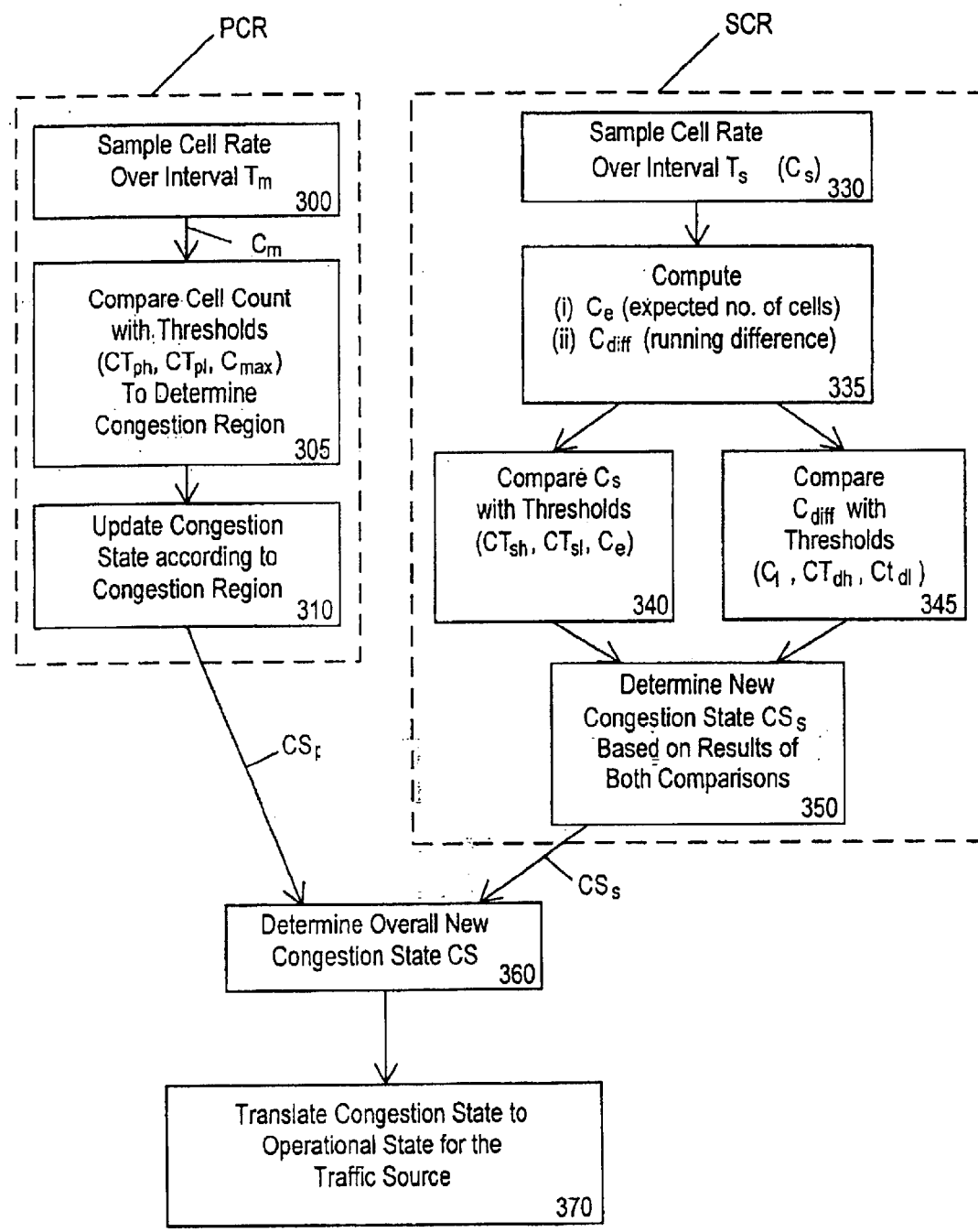
FIG. 10 shows known forms of Generic Cell Rate Algorithms (GCRA)

The method used to assess and control ATM VCC congestion will now be described with reference to the flow diagram shown in FIG. 10.

The PVG can simultaneously run two separate congestion detection algorithms: one targeting PCR and the other targeting SCR. This generates two separate congestion states: CSp and CSs reflecting the traffic states against PCR and SCR respectively. The new value of the combined congestion state, CS, is given by the maximum of the peak and sustained congestion states; i.e.

$$CS = \text{Max}(CSp, CSs).$$

The congestion states CSp and CSs are derived independently and the peak (PCR) and sustained (SCR) congestion algorithms may be run on a separate timebase. In each case the values of CSp and CSs are maintained until the next run of the associated congestion algorithm. A new value of CS is calculated whenever either algorithm runs. This means that the actual applied value of CS can increase on either peak or sustained congestion, but can only decrease if the conditions for a decrease are satisfied by both the peak and sustained algorithms.

The PVG can derive a congestion state relative to the PCR and SCR parameters based on a modification of the Generic Cell rate algorithm defined by the ATM Forum for ATM cell rate monitoring. The ATM Forum algorithm operates on a cell by cell basis but this is unnecessarily elaborate for this application. Instead, the PVG maintains a count of cells transmitted for each ATM VCC, and uses this to monitor number of cells transmitted over measurement intervals Tm and Ts. This cell count is used by both the PCR and SCR congestion detection algorithms.

Generic Cell Rate Algorithm (GCRA)

The GCRA, as defined in The ATM Forum Technical Committee Traffic Management Specification, will now be described. The GCRA is used to define conformance of ATM traffic with respect to the ATM traffic contract. For each cell arrival, the GCRA determines whether the cell conforms to the traffic contract of the connection. The policing (UPC) function may implement the GCRA, or one or more equivalent algorithms to enforce conformance. Although traffic conformance is defined in terms of the GCRA, the network is not required to use this algorithm (or the same parameter values) for the UPC. Rather, the network may use any UPC as long as the operation of the UPC supports the QoS objectives of a compliant connection.

Figure 11:
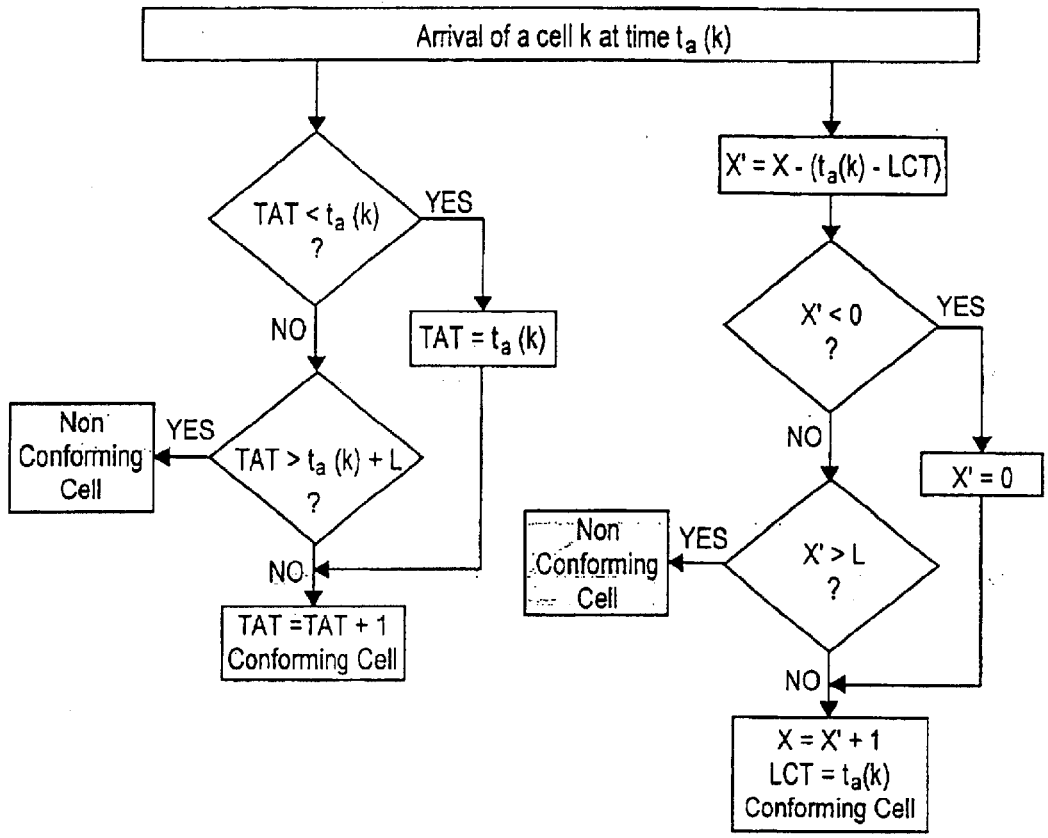
FIG. 11 shows a method of determining a new operational state for a traffic source which can be used in the apparatus of FIG. 9.

The GCRA is a virtual scheduling algorithm or a continuous-state Leaky Bucket Algorithm as defined by the flowchart in FIG. 11. The GCRA is used to define, in an operational manner, the relationship between PCR and CDVT and the relationship between SCR and the Burst Tolerance (BT). The BT can be derived from PCR, SCR, and MBS. In addition, the GCRA is used to specify the conformance, at the public or private UNI, of the declared values of the above two tolerances, as well as declared values of the traffic parameters PCR and SCR and MBS.

The GCRA is defined with two parameters: the Increment (I) and the Limit (L).

The notation "GCRA(I,L)" means the Generic Cell Rate Algorithm with the value of the increment parameter set equal to I and the value of the limit parameter set equal to L.

Note: I and L are not restricted to integer values.

The GCRA is formally defined in FIG. 11. The two algorithms in FIG. 11 are equivalent in the sense that for any sequence of cell arrival times $\{t_a(k), k>=1\}$, the two algorithms determine the same cells to b conforming and thus the same cells to be non-conforming. The two algorithms are easily compared by noticing that at each arrival epoch $t_a(k)$, and after the algorithms have been executed, TAT=X+LCT, as in FIG. 11. An explanation of each algorithm follows.

The virtual scheduling algorithm updates a Theoretical Arrival Time (TAT), which is the "nominal" arrival time of the cell assuming that the active source sends equally spaced cells. If the actual arrival time of a cell is not too "early" relative to the TAT, in particular if the arrival time is after TAT−L, then the cell is conforming, otherwise the cell is non-conforming.

Tracing the steps of the virtual scheduling algorithm in FIG. 11, at the arrival time of the first cell $t_a(1)$, the theoretical arrival time TAT is initialised to the current time, $t_a(1)$. For subsequent cells, if the arrival time of the $k^{th}$ cell, $t_a(k)$, is actually after the current value of the TAT then the cell is conforming and TAT is updated to the current time $t_a(k)$, plus the increment I. If the arrival time of the $k^{th}$ cell, $t_a(k)$, is greater than or equal to TAT−L but less than TAT (i.e., as expressed in FIG. 11, if TAT is less than or equal to $t_a(k)$+L), then again the cell is conforming, and the TAT is increased by the increment I. Lastly, if the arrival time of the $k^{th}$ cell is less that TAT−L (ie, if TAT is greater than $t_a(k)$+L), then the cell is non-conforming and the TAT is unchanged.

The continuous-state leaky bucket algorithm can be viewed as a finite-capacity bucket whose real-valued content drains out at a continuous rate of 1 unit of content per time-unit and whose content is increased by the increment I for each conforming cell. Equivalently, it can be viewed as the work load in a finite-capacity queue or as a real-valued counter. If, at a cell arrival, the content of the bucket is less than or equal to the limit value, L, then the cell is conforming, otherwise the cell is non-conforming. The capacity of the bucket (the upper bound on the counter) is L+I.

Tracing the steps of the continuous-state leaky bucket algorithm in FIG. 11 at the arrival time of the first cell $t_a(1)$, the content of bucket, X, is set to zero and the last conformance time (LCT) is set to $t_a(1)$. At the arrival time of the $k^{th}$ cell, $t_a(k)$, first the content of the bucket is provisionally updated to the value X', which equals the content of the bucket, X, after the arrival of the last conforming cell minus the amount which the bucket has drained since that arrival, where the content of the bucket is constrained to be non-negative. Second, if X' is less than or equal to the limit value L, then the cell is conforming, and the bucket content X is set to X' plus the increment I for the current cell, and the last conformance time LCT, is set to the current time $t_a(k)$. If, on the other hand, X' is greater than the limit value L, then the cell is non-conforming and the values of X and LCT are not changed.

Congestion Management

Congestion management capability is essential when the ATM network capacity is less than the maximum TDM data required to be carried across the ATM network.

The behaviour of the PVG congestion management algorithm for a particular VCC may be modified by the user by appropriate setting of the following provisional parameters in conjunction with the standard ATM traffic parameters for a VBR_rt VCC (PCR, SCR and MBS).

The congestion management parameters may be divided into those concerned with congestion avoidance through connection admission control and those concerned with controlling congestion for existing calls caused by the statistical behaviour of silence suppressed voice traffic.

(i) Connection Admission Control Parameters

Max Clear Channels: This attribute specifies the number of "clear channels" calls allowed per ATM VCC with guaranteed QOS during congestion periods.

Max Voice Band Data Channels: This attribute specifies the number of "Modem/FAX" calls allowed per ATM VCC with guaranteed QOS during congestion periods. A typical default value is 18 channels as ATM and AAL2 overhead is taken into consideration.

Number of Channels: This attribute specifies the number of channels allowed per ATM VCC. A typical default setting is 24.

Since each ATM VCC carries one DS1 worth of traffic, attributes are set on a per DS1 basis. The following table shows the congestion control attributes setting options and default values.

Connection admission control attributes settings

| Attribute | Setting options | Default setting |
|---|---|---|
| Max Clear Channels | 0 ... 18 | 0 |
| Max Voice Band Data Channels | 0 ... 24 | 18 |
| Number of Channels | 1 ... 24 | 24 |

(ii) Congestion Management Algorithm Parameters

The following parameters are used to control the behaviour of the algorithm which is used to manage the AAL2 traffic between the CPE and PVG. Note that due to architectural differences, the CPE and PVG by necessity use different control algorithms, and therefore are controlled via different parameters.

PVG Congestion Management Algorithm Parameters
PVG PCR Control Parameters
  Attributes are set on a VCC/DS1 basis.
  Basic Traffic measurement Interval Tm: Tm (Traffic Measurement interval) is the basic unit of time at which the cell rate is sampled by the PCR congestion management algorithm. This parameter should be defined to be short enough so that the system responds quickly to PCR violation. It must however be long enough to allow the voice system to react to changes and for those changes to stabilise before the next sample.
  Congestion Threshold Peak High (CTph): CTph (Congestion Threshold Peak High) parameter provides the upper bound of operation relative to PCR before the most severe congestion management measures are invoked. It is defined as a percentage of PCR.
  Congestion Threshold Peak Low (CTpl): CTpl (Congestion Threshold Peak Low) parameter provides the upper bound of normally acceptable operation relative to PCR. In the region between Ctpl and Ctph mild congestion management measures are invoked. It is defined as a percentage of PCR.

PCR management control attributes settings

| Attribute | Setting options | Default setting |
|---|---|---|
| Basic Traffic measurement interval (Tm) | 50 ms to 500 ms in 50 ms steps | 100 ms |
| Congestion Threshold Peak High (CTph) | 50% to 100% in 1% steps | 90% |
| Congestion Threshold Peak Low (CTpl) | 50% to 100% in 1% steps | 80% |

Note
CTpl ≦ CTph

PVG SCR Control Parameters
  Attributes are set on a VCC/DS1 basis.
  SCR Traffic management interval (Ts): This is the period of time at which the cell rate is sampled by the SCR congestion management algorithm. This parameter should be defined to be short relative to the maximum permitted burst duration so that the system meets SCR traffic criteria and maintains the required Frame Relay QOS on the link. It should however be long enough to avoid unnecessary downspeeding due to very transient load condition. Ts is defined as a multiple of the value of Tm.
  Congestion Threshold SCR High (CTsh): CTsh (Congestion Threshold SCR High) parameter provides the lower bound of the upper region of operation relative to SCR. It is defined as a percentage of the expected number of cells received in Ts at SCR.
  Congestion Threshold SCR low (CTsl): CTsl (Congestion Threshold SCR low) parameter provides the upper bound of the lowest region of operation relative to SCR. It is defined as a percentage of the expected number of cells received in Ts at SCR.
  Congestion Threshold SCR Burst High (CTbh): CTbh (Congestion Threshold SCR Burst High) parameter provides the lower bound of the upper region for accumulated SCR burst count. It is defined as a percentage of the Cell burst limit Cl where Cl=f(MBS, SCR, PCR).
  Congestion Threshold SCR Burst Low (CTbl): CTbl (Congestion Threshold SCR Burst Low) parameter provides the upper bound for the normally safe region for accumulated SCR burst count. It is defined as a percentage of the Cell burst limit Cl where Cl=f(MBS, SCR,PCR).

SCR management control attributes settings

| Attribute | Setting options | Default setting |
|---|---|---|
| SCR Traffic measurement interval (Ts) | 1 to 5 (times Tm) | 2 |
| Congestion Threshold SCR High (CTsh) | 100% to 150% in 1% steps | 125% |
| Congestion Threshold SCR Low (CTsl) | 50% to 100% in 1% steps | 75% |
| Congestion Threshold SCR Burst High (CTbh) | 50% to 100% in 1% steps | 90% |
| Congestion Threshold SCR Burst Low (CTbl) | 0% to 100% in 1% steps | 70% |

Congestion Detection—PCR

Referring again to FIG. 10, one part of the control method (steps 300, 305, 310) monitors peak cell rate (PCR) and derives a congestion state CSp which reflects the current PCR relative to the permitted PCR for the traffic channel. The PCR algorithm should respond quickly to voice traffic exceeding PCR since any long period of voice traffic in excess of PCR could result in buffer build up or overflow, leading to large cell delay variation or cell loss.

A measurement of cell count is made over an interval Tm (step 300). Tm is user provisionable, but preferably ~100 ms.

The measured number of cells in Tm=Cm.

The number of cells expected if transmitting at PCR is Cmax=Tm×PCR.

If Cm approaches or exceeds Cmax a congestion state will be entered for that VCC.

PCR Congestion Regions

Figure 12:
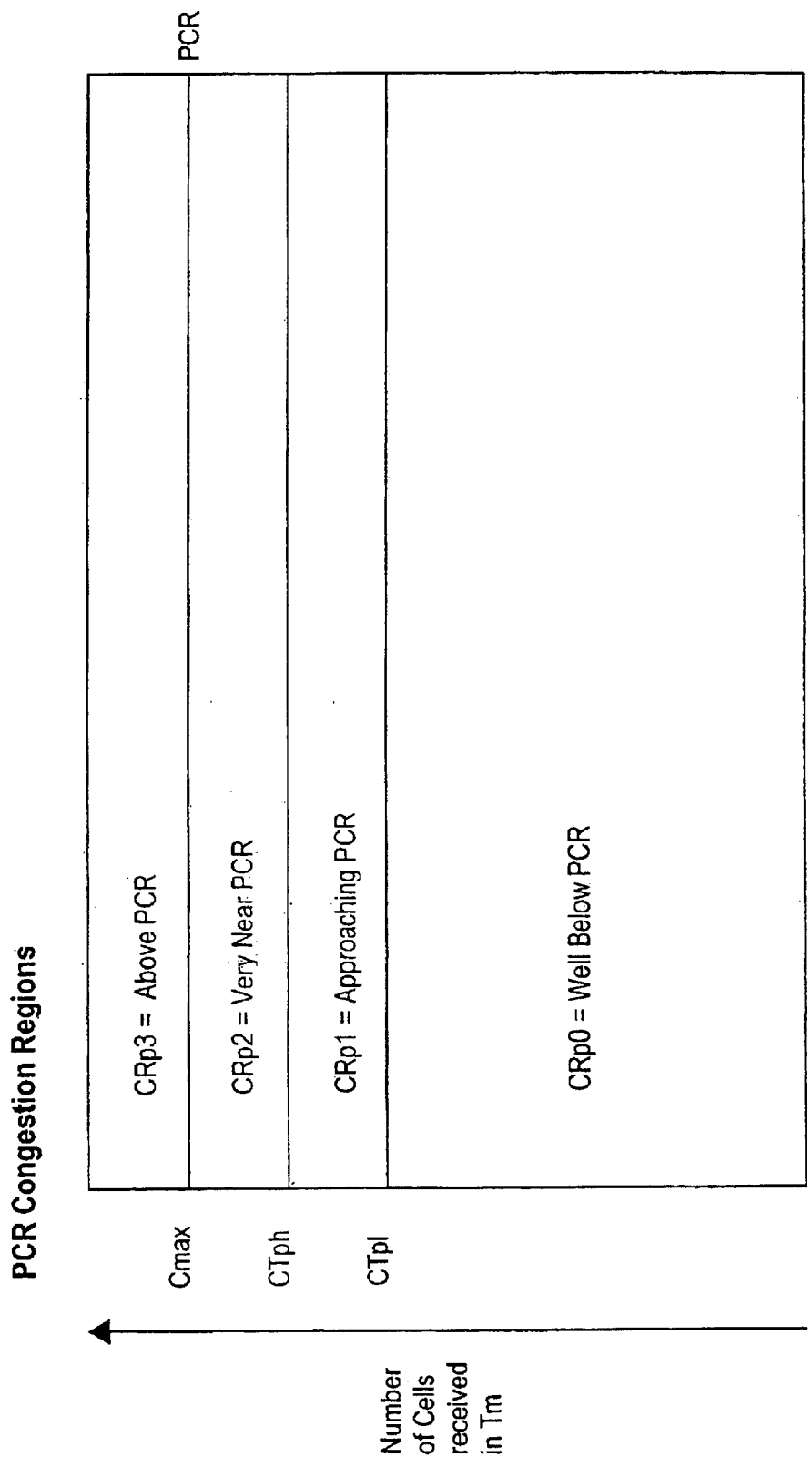
FIG. 12 shows a way of assessing Peak Cell Rate (PCR) for use in the method of FIG. 11.

The mechanism is driven by user configurable thresholds which bound regions of values for Cm. The two thresholds, CTph and CTpl along with Cmax define 4 regions for Cm (see FIG. 12). The measured value Cm is compared with the set of thresholds to determine which region it falls within (step 305). The new peak congestion state CSp is a function of the old congestion state CS and the congestion region (peak) into which the measured cell count Cm falls within following a measurement interval (step 310).

Generally, the following actions are defined for each region:

CRp0: CSp=CS−1, i.e. if count Cm falls within region CRp0 then lower the congestion state by one.

CRp1: CSp=CS

CRp2: CSp=CS+1

CRp3: CSp=CS+2

Congestion Detection—SCR

Referring again to FIG. 10, a second part of the control method (steps 330, 335, 340, 345, 350) monitors sustained cell rate (SCR) and derives a congestion state CSs which reflects the current SCR relative to the permitted SCR for the traffic channel. The modified SCR Generic Cell rate algorithm samples the VCC cell counts every Ts seconds (step 330), where Ts=nTm and n is provisionable, and uses the results to compute a running difference between the actual number of cells transmitted and that allowed according to the rules defined below.

According to step 335:

The number of cells expected if transmitting at SCR is

Ce=Ts×SCR

The number of cells actually transmitted during Ts is Cs

The running difference Cdiff is defined as:

Ctmp=Cdiff+(Cs−Ce)

If Ctmp>0

Cdiff=Ctmp

Else

Cdiff=0

Note that this is analogous to the leaky bucket algorithm defined for the GCRA. If cells above SCR are transmitted they accumulate and must be compensated for by a later reduction. If the leaky bucket empties. its value cannot go negative. This restricts future bursts to the maximum burst value.

The maximum allowed value of Cdiff to meet the MBS requirement is Cl (Climit).

To derive an expression for Cl consider a continuous burst of MBS cells at PCR.

Cl is the difference between the cells actually transmitted and those expected at SCR:

Cl

=MBS−Max_Burst_Duration_voice×SCR

=MBS−(MBS/PCR)×SCR

=MBS×(1−SCR/PCR)

Cl must be rounded to the integer part of this expression so:

$$Cl=INT(MBS\times(1-SCR/PCR))$$

The objective of the congestion management scheme therefore is to ensure that Cdiff is always below Cl while maximizing the ability of the voice application to use cell bursts at up to PCR to accommodate short voice bursts.

Note that Cdiff<Cl does not strictly guarantee that the SCR GCRA will not be exceeded since due to the larger granularity of the PVG algorithm it is possible for it to underestimate the GCRA by a maximum of Ce×(1−SCR/PCR) cells. This can be factored in to the limit calculations above and would serve to reduce the effective value of Cl so that:

$$Cl=INT(MBS\times(1-SCR/PCR)-Ts\times SCR\times(1-SCR/PCR))$$

The SCR congestion detection algorithm uses the parameters derived from this modified GCRA algorithm (accumulated burst information Cdiff and current rate Cs) along with the connection parameters and the current congestion state to derive a new value for the congestion state. The aim is allow bursts by accommodating instantaneous rate in excess of SCR as long as the accumulated cell bursts (Cdiff) does not threaten the limit (Cl).

Figure 13:
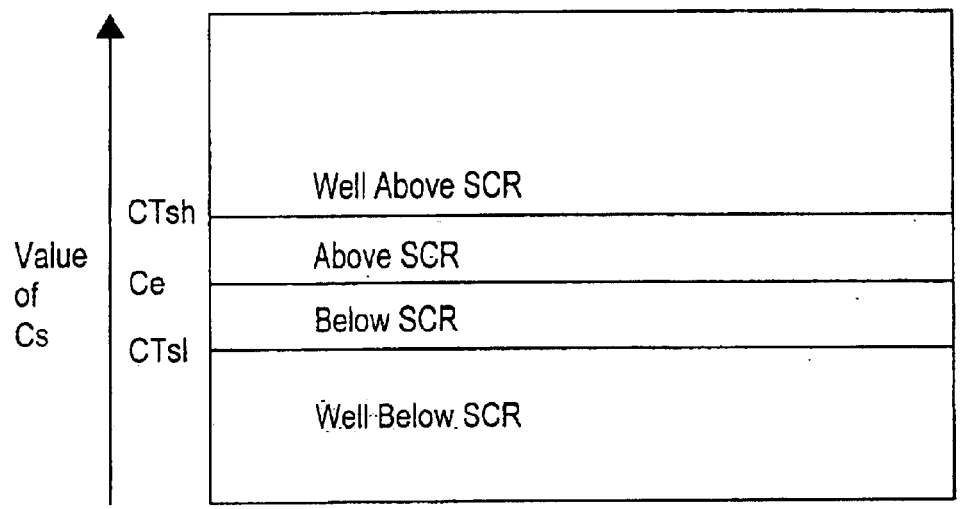
FIGS. 13 and 14 show ways of assessing sustained cell rate (SCR) in the method of FIG. 11.
Figure 14:
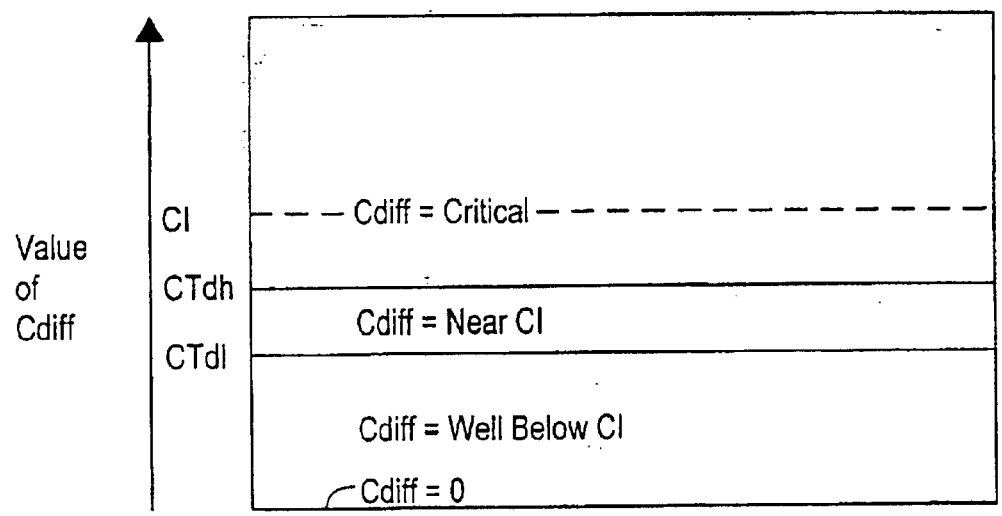

The mechanism is driven by user configurable thresholds which bound regions of values for both Cs and Cdiff. The two thresholds, CTsh and CTsl along with Ce define 4 regions for Cs (see FIG. 13) while the two thresholds CTdh and CTdl define 4 regions for Cdiff (see FIG. 14). The current values of Cs and Cdiff are each compared with the respective set of thresholds to determine which region they fall within. The new SCR congestion state (step 350) is defined as a function of the overall congestion state CS, the region of Cs, and the region of Cdiff.

$$CSs=f(CS,\ Cs,\ Cdiff)$$

A preferred function for deriving CSs is shown in the following table. Each entry in this table corresponds to a combination of Cs and Cdiff regions. The action shown in the entry is an operation on the old value of overall congestion state to give the new value of SCR congestion state. All new values of CSs are defined relative to the current value of overall congestion state, CS, so that equilibrium can be maintained when an optimum operating point is achieved.

As an example if Cs is above Ce (current rate above SCR) but Cdiff is well below Cl then the congestion state is left unchanged since there is plenty of burst tolerance left in the system. However, if Cs is in the same region and Cdiff is very near Cl then the congestion state is increased by two since there is significant danger that Cl might be exceeded. Alternatively if Cdiff stays well below Cl and Cs falls to bellow Ce (current rate below SCR) then the congestion state is decremented since Cdiff is well below Cl and decreasing.

Cm SCR Congestion Regions

The following four regions are defined for SCR measurement:

Well below SCR is defined as Cs≦CTsl

Below SCR is defined as CTsl≦Cs≦Ce

Above SCR is defined as Ce<Cs≦CTsh

Well above SCR is defined as Cs<CTsh

Cdlff Congestion Regions

The following three regions are defined for Cdiff regions:

Well below Cl is defined as 0<Cdiff≦CTdl

Near Cl is defined as CTdl<Cdiff≦CTdh

Critical is defined as CTdh<Cdiff

| Congestion state table for SCR congestion management | | | | |
|---|---|---|---|---|
| Cm/Cdiff | 0 | Well Below | Near | Critical |
| Well below | CSs = CS − 1 | CSs = CS − 1 | CSs = CS − 1 | CSs = CS |
| Below | CSs = CS − 1 | CSs = CS − 1 | CSs = CS | CSs = CS |
| Above | CSs = CS | CSs = CS | CSs = CS | CSs = CS + 1 |
| Well Above | CSs = CS | CSs = CS | CSs = CS + 1 | CSs = CS + 2 |

The separate PCR and SCR algorithms generate two separate congestion states: CSp and CSs reflecting the traffic states against PCR and SCR respectively. At step 360 these two states are used to derive a new value of the combined congestion state, CS. A preferred way of deriving the overall congestion state is to set the overall congestion state Cs as the maximum of the peak and sustained congestion states; i.e.

$$CS=\text{Max}(CSp, CSs).$$

However, other functions could also be used.

At step 370 the new overall congestion state is translated into a new operational state for the traffic source. An operational state can define a combination of operating conditions for the traffic source, i.e. a particular coding rate, use of silence suppression, how voiceband data is carried, and how digital data is carried. The tables previously shown (examples 1 to 5) illustrate this.

Cpe Congestion Detection

CPE can detect the congestion condition by monitoring the atm egress buffer fill level.

We claim:

1. A method of monitoring a packet-based communications traffic flow comprising the steps of:

setting a first time interval over which a packet count measurements for the monitored traffic flow is to be made;

counting a number of packets flowing during that time interval;

using the packet count measurement to derive parameters which are indicative of the traffic flow meeting a sustained cell rate (SCR) requirement; and comparing the derived parameters indicative of the traffic flow meeting a sustained cell rate (SCR) requirement with at least one parameter indicative of available traffic flow capacity to derive a new congestion state for a source of said monitored traffic flow from a set of determined congestion states, each of said determined congestion states mapping to a respective operational state of said traffic flow source.

2. A method according to claim 1 wherein the derived parameters are: current packet rate and a running difference between the counted number of packets and an expected number of packets.

3. A method according to claim 2 wherein each of the derived parameters is compared with a respective parameter indicative of at least one of capacity on the link and an agreed traffic contract, and the result of both of said comparisons is used to determine compliance with the SCR requirement.

4. A method according to claim 1 wherein it includes the steps of: translating the new congestion state derived for the traffic flow source into a corresponding one of said set of determined operational states to derive a new operational state for the traffic flow source; and applying said new operational state to said traffic flow source.

5. A method according to claim 1 wherein the new congestion state is a function of a previous congestion state for the traffic flow source and the derived parameters indicative of said traffic flow meeting a sustained cell rate (SCR) requirement.

6. A method according to claim 1 wherein the first time interval is approximately 500 ms.

7. A method according to claim 1 further comprising the steps of:

setting a second time interval over which a second packet count measurements for the monitored traffic flow is to be made;

counting a number of packets flowing during that time interval; and using the second packet count measurement to derive a parameter which is indicative of the traffic flow meeting a peak cell rate (PCR) requirement.

8. A method according to claim 7 wherein the second time interval is a shorter interval than the first interval.

9. A method according to claim 8 wherein the second time interval is in the range 50–500 ms.

10. A method according to claim 9 wherein the second time interval is 100 ms.

11. A method according to claim 7 wherein it includes the step of comparing the derived parameter indicative of the traffic flow meeting a peak cell rate (PCR) requirement with at least one parameter indicative of available traffic flow capacity to derive a new congestion state for the traffic flow source from the set of determined congestion states.

12. A method according to claim 11 wherein the new congestion state derived for the traffic flow source is a function of the new congestion state derived from the step of comparing the derived parameters indicative of the traffic flow meeting a sustained cell rate (SCR) requirement with at least one parameter indicative of available traffic flow capacity and the step of comparing the derived parameter indicative of the traffic flow meeting a peak cell rate (PCR) requirement with at least one parameter indicative of available traffic flow capacity.

13. A method according to claim 12 wherein the at least one parameter indicative of available traffic flow capacity used in the step of comparing the derived parameters indicative of the traffic flow meeting a sustained cell rate (SCR) requirement with at least one parameter indicative of available traffic flow capacity is different to the at least one parameter indicative of available traffic flow capacity used in the step of comparing the derived parameter indicative of the traffic flow meeting a peak cell rate (PCR) requirement with at least one parameter indicative of available traffic flow capacity.

14. A method of monitoring a packet-based communications traffic flow comprising the steps of:

setting a first time interval over which a packet count measurement for the monitored traffic flow is to be made;

counting a number of packets flowing during that time interval;

using the packet count measurement to derive at least one parameter which is indicative of the traffic flow meeting a cell rate (CR) requirement; and comparing the derived parameter indicative of the traffic flow meeting a cell rate (CR) requirement with at least one parameter indicative of available traffic flow capacity to derive a new congestion state for a source of said monitored traffic flow from a set of determined congestion states, each of said determined congestion states mapping to a respective operational state of said traffic flow source.

15. A method according to claim 14 wherein said cell rate requirement is at least one of sustained cell rate (SCR) and peak cell rate (PCR).

16. A method according to claim 14 wherein it includes the steps of: translating the new congestion state derived for the traffic flow source into a corresponding one of said set of determined operational states to derive a new operational state for the traffic flow source; and applying said new operational state to said traffic flow source.

17. A method according to claim 14 wherein it includes the steps of:

setting a first time interval over which a first packet count measurement for the monitored traffic flow is to be made for deriving the at least one parameter which is indicative of the traffic flow meeting a sustained cell rate (SCR) requirement;

setting a second time interval over which a second packet count measurement for the monitored traffic flow is to be made for deriving the at least one parameter which is indicative of the traffic flow meeting a peak cell rate (PCR) requirement.

18. A method according to claim 17 wherein the second time interval is shorter than the first time interval.

19. A method according to claim 17 wherein it includes the steps of:

comparing the derived parameter indicative of the traffic flow meeting a sustained cell rate (SCR) requirement with at least one parameter indicative of available traffic flow capacity to derive a new SCR congestion state for the traffic flow source;

comparing the derived parameter indicative of the traffic flow meeting a peak cell rate (PCR) requirement with at least one parameter indicative of available traffic flow capacity to derive a new PCR congestion state for the traffic flow source; and deriving a new overall congestion state for the traffic flow source from said new SCR and PCR congestion states.

20. A method according to claim 19 wherein it includes the steps of: translating the new overall congestion state derived for the traffic flow source into a corresponding one of said set of determined operational states to derive a new operational state for the traffic flow source; and applying said new operational state to said traffic flow source.

21. Apparatus for monitoring a packet-based communications traffic flow comprising:

means for setting a time interval over which a packet count measurement for the monitored traffic flow is to be made;

means for counting a number of packets flowing during that time interval;

means using the packet count measurement for deriving at least one parameter which is indicative of the traffic flow meeting a cell rate (CR) requirement; and means for comparing the derived parameter indicative of the traffic flow meeting a cell rate (CR) requirement with at least one parameter indicative of available traffic flow capacity to derive a new congestion state for a source of said monitored traffic flow from a set of determined congestion states, each of said determined congestion states mapping to a respective operational state of said traffic flow source.

22. An apparatus according to claim 21 wherein said means using the packet count measurement for deriving a parameter which is indicative of the traffic flow meeting a cell rate (CR) requirement is arranged to derive a parameter which is indicative of at least one of sustained cell rate (SCR) and peak cell rate (PCR).

23. An apparatus according to claim 21 wherein means for setting a time interval is arranged to set a first time interval over which a first packet count measurement for the monitored traffic flow is to be made for deriving the at least one parameter which is indicative of the traffic flow meeting a sustained cell rate (SCR) requirement; and to set a second time interval over which a second packet count measurement for the monitored traffic flow is to be made for deriving the at least one parameter which is indicative of the traffic flow meeting a peak cell rate (PCR) requirement.

24. An apparatus according to claim 23 wherein the second time interval is shorter than the first time interval.

25. Apparatus for monitoring a packet-based communications traffic flow comprising a processor which performs the steps of:

setting a first time interval over which a packet count measurement for the monitored traffic flow is to be made;

counting a number of packets flowing during that time interval;

using the packet count measurement to derive at least one parameter which is indicative of the traffic flow meeting a cell rate (CR) requirement; and comparing the derived parameter indicative of the traffic flow meeting a cell rate (CR) requirement with at least one parameter indicative of available traffic flow capacity to derive a new congestion state for a source of said monitored traffic flow from a set of determined congestion states, each of said determined congestion states mapping to a respective operational state of said traffic flow source.

26. A computer-readable medium whose contents cause a processor of an apparatus for monitoring a packet-based communications traffic flow to perform the steps of:

setting a first time interval over which a packet count measurement for the monitored traffic flow is to be made;

counting a number of packets flowing during that time interval;

using the packet count measurement to derive at least one parameter which is indicative of the traffic flow meeting a cell rate (CR) requirement; and comparing the derived parameter indicative of the traffic flow meeting a cell rate (CR) requirement with at least one parameter indicative of available traffic flow capacity to derive a new congestion state for a source of said monitored traffic flow from a set of determined congestion states, each of said determined congestion states mapping to a respective operational state of said traffic flow source.

* * * * *